(12) United States Patent
Jalon et al.

(10) Patent No.: US 9,449,012 B2
(45) Date of Patent: Sep. 20, 2016

(54) CLOUD LIBRARY DE-DUPLICATION

(71) Applicant: Apple Inc., Cupertino, CA (US)

(72) Inventors: Julien J. Jalon, San Francisco, CA (US); Nicholas J. Woods, San Francisco, CA (US); Raymond Wai-Keung Wong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 14/292,231

(22) Filed: May 30, 2014

(65) Prior Publication Data

US 2015/0347444 A1    Dec. 3, 2015

(51) Int. Cl.
*G06F 17/00* (2006.01)
*G06F 17/30* (2006.01)

(52) U.S. Cl.
CPC ... *G06F 17/30156* (2013.01); *G06F 17/30044* (2013.01)

(58) Field of Classification Search
None
See application file for complete search history.

(56) References Cited

U.S. PATENT DOCUMENTS

| | | | |
|---|---|---|---|
| 7,840,537 B2 * | 11/2010 | Gokhale | G06F 11/1453 707/652 |
| 8,037,028 B2 * | 10/2011 | Prahlad | G06F 11/1453 707/652 |
| 8,285,683 B2 * | 10/2012 | Prahlad | G06F 11/1453 707/652 |
| 8,396,841 B1 * | 3/2013 | Janakiraman | G06F 3/0608 707/692 |
| 8,407,186 B1 | 3/2013 | Cremelie et al. | |
| 9,020,900 B2 * | 4/2015 | Vijayan Retnamma | 707/652 |
| 2010/0250549 A1 * | 9/2010 | Muller | G06F 17/30575 707/741 |
| 2010/0332401 A1 * | 12/2010 | Prahlad | G06F 17/3002 705/80 |
| 2011/0313972 A1 | 12/2011 | Albouze | |
| 2012/0290546 A1 | 11/2012 | Smith et al. | |
| 2012/0323860 A1 * | 12/2012 | Yasa | G06F 17/30156 707/692 |
| 2013/0036098 A1 | 2/2013 | Mutalik et al. | |
| 2013/0086006 A1 * | 4/2013 | Colgrove | G06F 3/0688 707/692 |
| 2013/0097380 A1 * | 4/2013 | Colgrove | G06F 17/30159 711/118 |
| 2013/0198150 A1 | 8/2013 | Kim et al. | |
| 2013/0290274 A1 | 10/2013 | Patil et al. | |
| 2013/0339317 A1 | 12/2013 | Kim et al. | |
| 2013/0339848 A1 | 12/2013 | Patil et al. | |
| 2014/0114934 A1 * | 4/2014 | Chakraborty | G06F 3/0608 707/692 |
| 2015/0012504 A1 * | 1/2015 | Akirav | G06F 17/30156 707/692 |

FOREIGN PATENT DOCUMENTS

WO    2009/132144    10/2009

OTHER PUBLICATIONS

International Search Report and Written Opinion from PCT Application No. PCT/US2015/027330 dated Aug. 4, 2015.

* cited by examiner

*Primary Examiner* — Hung Le
(74) *Attorney, Agent, or Firm* — Blank Rome LLP

(57) ABSTRACT

Disclosed herein are systems, methods, and non-transitory computer-readable storage media identifying duplicate media items that occur during a batch upload process from a client device to the cloud media library and performing media de-duplication and re-mapping of duplicate media items.

20 Claims, 11 Drawing Sheets

| Input A1 has adjustment | Potential Dup A2 has adjustment | A1 more recent | Dup ? | Winner | Action | Comment |
|---|---|---|---|---|---|---|
| N | N | Y | Y | A1 | A1 remapped to A2, A1 contents copied to A2, A2 modfied. Persist A1 and A2. | latest recordModificationDate wins |
| N | N | N | Y | A2 | A1 remapped to A2. Persist A1. | latest recordModificationDate wins |
| N | Y | N/A | Y | A2 | A1 remapped to A2. Persist A1. | adjustment trumps no adjustment |
| Y | N | N/A | Y | A1 | A1 remapped to A2, A1 contents copied to A2, A2 modfied. Persist A1 and A2. | adjustment trumps no adjustment |

FIG. 4A

| A1 has SFP | A1 has OFP | A2 has SFP | A2 has OFP | Same SFP | Same OFP | A1 more recent | dup? | Winner | Action | Comment |
|---|---|---|---|---|---|---|---|---|---|---|
| Y | N | Y | N | Y | N/A | Y | Y | A1 | A1 remapped to A2, A1 contents copied to A2, A2 modfied. Persist both. | timestamp tiebreak |
| Y | N | Y | N | Y | N/A | N | Y | A2 | A1 remapped to A2. Persist A1. | timestamp tiebreak |
| N | Y | N | Y | N/A | Y | Y | Y | A1 | A1 remapped to A2, A1 contents copied to A2, A2 modified. Persist both. | timestamp tiebreak |
| N | Y | N | Y | N/A | Y | N | Y | A2 | A1 remapped to A2. Persist A1. | timestamp tiebreak |
| Y | Y | Y | Y | Y | Y | Y | Y | A1 | A1 remapped to A2, A1 contents copied to A2, A2 modified. Persist both. | timestamp tiebreak |
| Y | Y | Y | Y | Y | Y | N | Y | A2 | A1 remapped to A2. Persist A1. | timestamp tiebreak |
| All other cases | | | | N/A | N | N/A | | | A1 not remapped, A2 unchanged. Persist A1. | No dups |

FIG. 4B

CLOUD LIBRARY DE-DUPLICATION

BACKGROUND

1. Technical Field

The present disclosure relates to duplications of items in a library and more specifically to de-duplication of a library.

2. Introduction

Some computing systems involve storing content in a network-based content repository and allowing client devices to retrieve the content on demand. This arrangement can be well suited for users, businesses, and other enterprises that share content between multiple electronic devices. For example, a user can choose to take photographs using a portable electronic device, edit the photographs using a desktop device, and display the photographs on a tablet computer device. In these cases, a network-based content repository can be a convenient way to store the original digital photographs, save edits to the photographs, share them between devices, etc. without physically connecting devices and without having each version of each photograph taking up space on each device.

However, using network-based storage for multiple devices can result in the same or similar files being stored multiple times in the network-based repository. This results in unneeded memory usage and can also detract from a user's experience. Following the previous example, having multiple versions of the same digital photograph stored in a network-based repository can be tedious to sort through, confusing to the user, etc.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for identifying duplicate media items in a cloud media library. Identifying duplicate media items can occur during a batch upload process from a client device to the cloud media library. Also, the cloud media library can include or can be operably coupled to a cloud photo library engine that performs photo de-duplication, re-mapping, etc.

Some embodiments of the present technology involve the cloud photo library engine receiving a media file from a client device, inspecting one or more data objects in the media file, and identifying, in a data object, a reference to a master asset fingerprint and a secondary fingerprint. The cloud photo library engine determines whether a master asset described by the master fingerprint is already stored by the cloud media library. If not, a new record can be created and the media file is stored.

If a master asset described by the master fingerprint is already stored by the cloud media library, the cloud photo library determines if the media asset is not accompanied by the master. If so, the cloud photo library determines that the user explicitly wants a duplicate and stores the asset.

If a master asset described by the master fingerprint is already stored by the cloud media library and if the media asset is accompanied by the master, the cloud photo library engine performs de-duplication.

In some embodiments of the present technology, de-duplication can involve gathering all of the additional data objects in the cloud media library including a reference to the master fingerprint of the received media file and detecting matching secondary fingerprints that describe adjustments that have been made to the master asset to form the media file.

In some embodiments of the present technology, the cloud photo library engine can determine that the adjustments described in the secondary fingerprints fall within a predefined group of adjustment considered acceptably different for the purpose of de-duplication. For example, adjustments to photographs in the form of red-eye reduction, lightening and darkening, and automatic enhancement can be considered minor enough and/or easily re-creatable to consider an asset with these adjustments to be duplicates of photographs without the adjustments.

For assets with matching secondary fingerprints and acceptably different secondary fingerprints, de-duplication can involve examining the secondary fingerprints to determine the adjustments made to the assets, examining a time stamp described in data object of the assets to determine when received media file was last modified, and selecting an asset based on a de-duplication policy that factors the presence and timing of adjustments made to the assets.

Once a asset is selected for de-duplication, the cloud photo library engine can inspect its container data object that describes a relationship between itself and another media file in the cloud media library and re-map the container data object of the non-selected media file to describe a relationship with the selected media file.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4A illustrates de-duplication logic table used in some embodiments when at most one of the two assets considered for de-duplication has adjustments;

FIG. 4B illustrates de-duplication logic table used in some embodiments when both assets have adjustments;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for providing user's with access to an entire collection of media, from all of their devices, on any of their devices without the collection being filled with duplicate media items. A system, method and non-transitory computer-readable media are disclosed which identify duplicate media items that occur during a batch upload process from a client device to the cloud media library and which perform photo de-duplication and re-mapping of duplicate media items.

Some embodiments of the present technology involve a network-based media library for providing users with the ability to synchronize, organize, back up, and access a media collection across many devices. Although a wide variety of media types can benefit from the present technology, the term "cloud photo library" will be used herein for illustration purposes.

Figure 1:
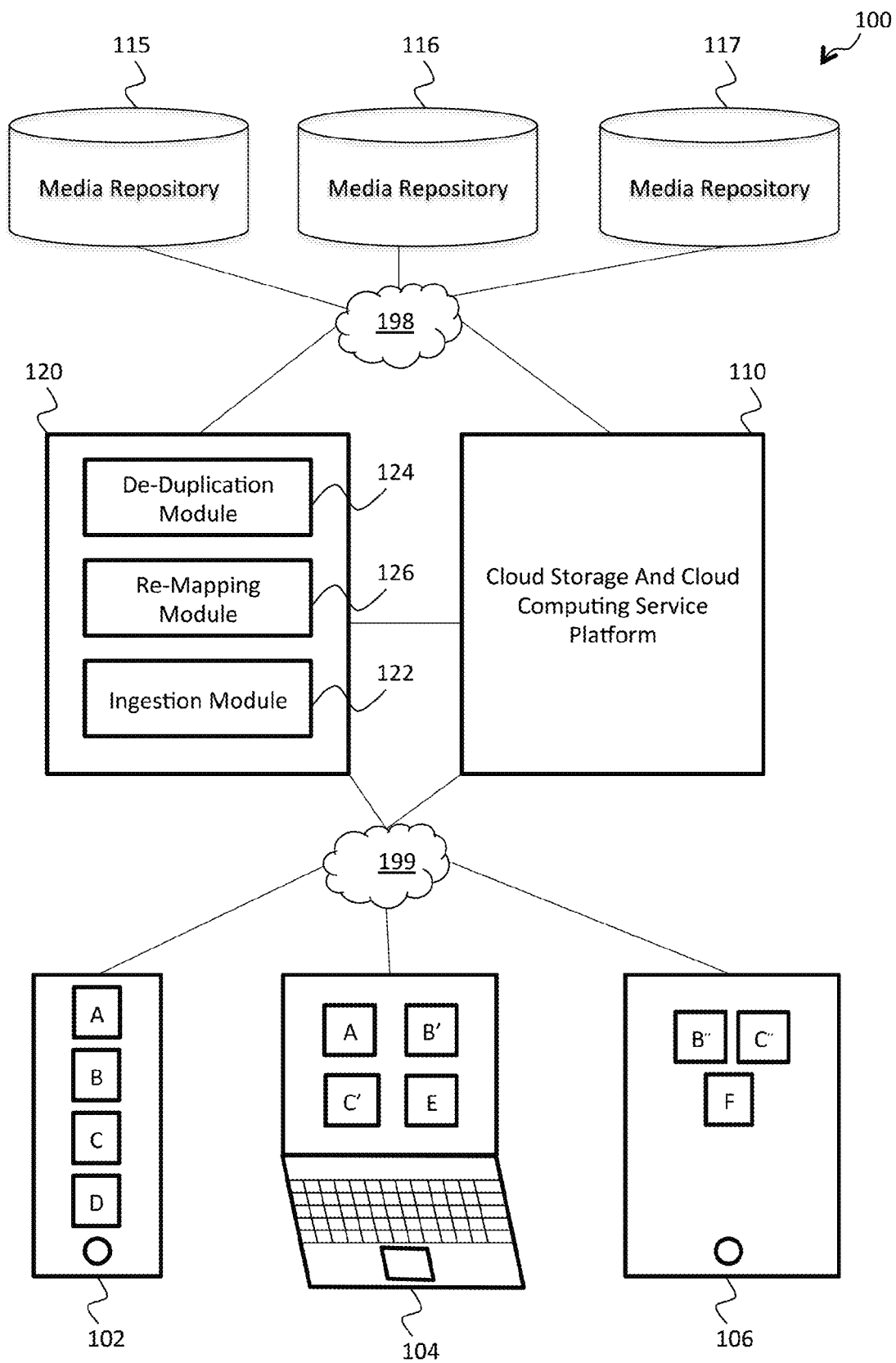
FIG. 1 illustrates a system for providing a cloud photo library to a user having photos stored on a plurality of devices according to some embodiments of the present technology.

FIG. 1 illustrates a system 100 for providing a cloud photo library to a user having photos stored on a plurality of devices according to some embodiments of the present technology. The system 100 includes a first electronic device 102, a second electronic device 104, and an $n^{th}$ electronic device 106, each in communication with a cloud storage and cloud computing service platform 110 via one or more network 199.

Figure 5:
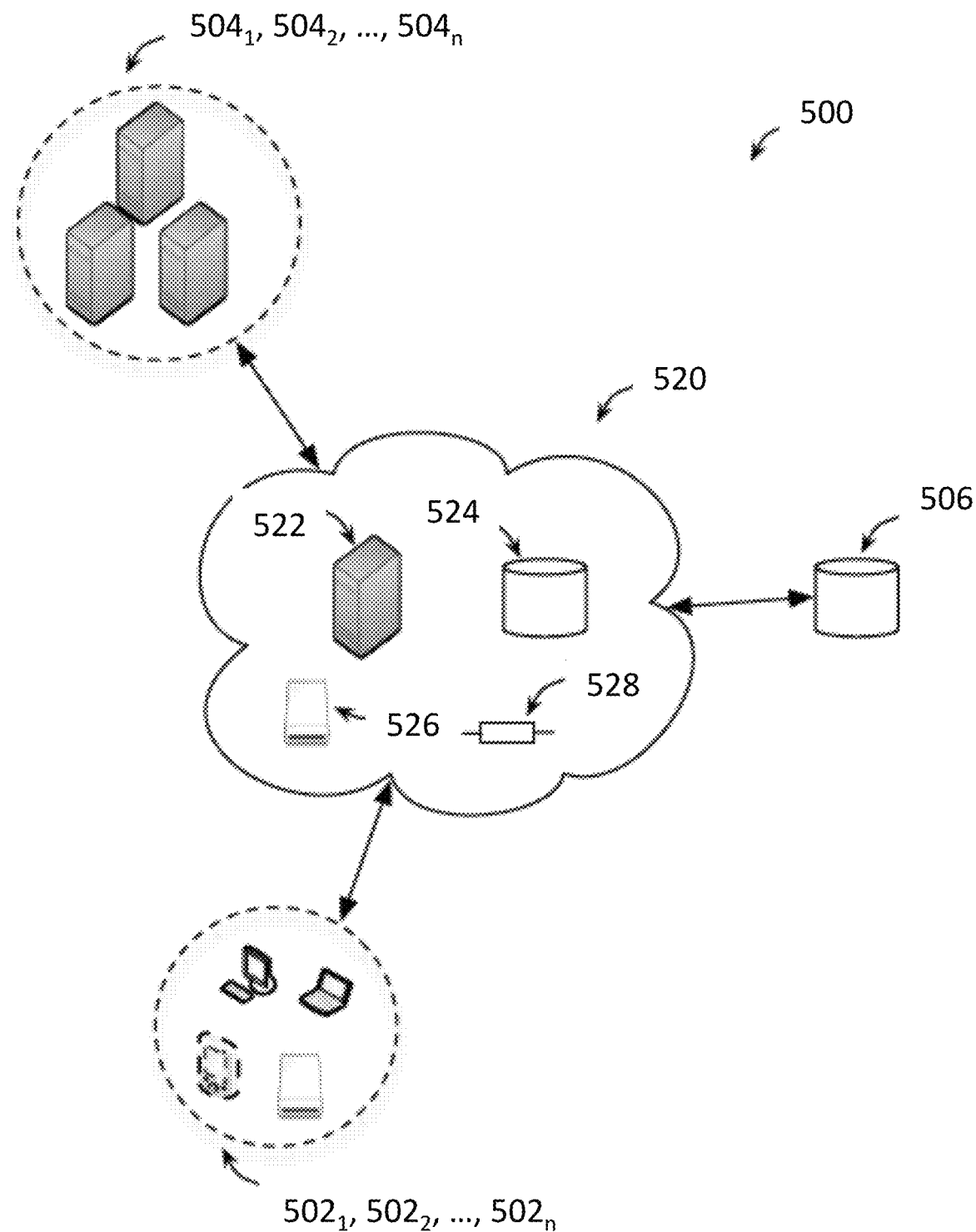
FIG. 5 illustrates an example cloud computing system configuration.

Cloud computing is a type of Internet-based computing in which a variety of resources are hosted and/or controlled by an entity and made available by the entity to authorized users via the Internet, as explained in greater detail with reference to FIG. 5 below.

In some embodiments the first electronic device 102, the second electronic device 104, and the $n^{th}$ electronic device 106 are each associated with a single user account in the cloud storage and cloud computing service platform 110 and each contain media items. For example, the first electronic device 102 contains media items A, B, C, and D; the second electronic device 104 contains media items A, B', C', and E; and the $n^{th}$ electronic device 106 contains media items B", C", and F.

As explained above, there is a need in the art for providing users with access to an entire collection of media, from all of their devices, on any of their devices. Accordingly, some embodiments of the present technology involve a cloud photo library (sometimes referred to as "CPL") engine 120 that performs photo de-duplication, re-mapping, etc. for the cloud storage and cloud computing service platform 110. The cloud storage and cloud computing services platform 110 and/or the CPL engine 120 are also in communication, via a network 198, with one or more media repositories 130a, 130b, . . . , 130n configured for storing media items. Network 198 and network 199 can be the same or different networks.

The CPL engine 120 can include an ingestion module 122 configured to receive media files, derivative media assets, data objects describing media files and assets, etc. The individual electronic devices (102, 104, 106) manually or automatically initiate an upload of media or batches of media. Also, the ingestion module 122 can request media from the electronic devices (102, 104, 106).

Additionally, the CPL engine 120 includes a de-duplication module 124 for examining media files, derivative media assets, data objects describing media files and assets, etc. as they are ingested, determining when a duplicate is present, and for performing one or more de-duplication actions as explained in greater detail below. The CPL engine 120 can include a re-mapping module 126 for re-mapping media asset's container relationships, as explained in greater detail below.

Figure 2A:
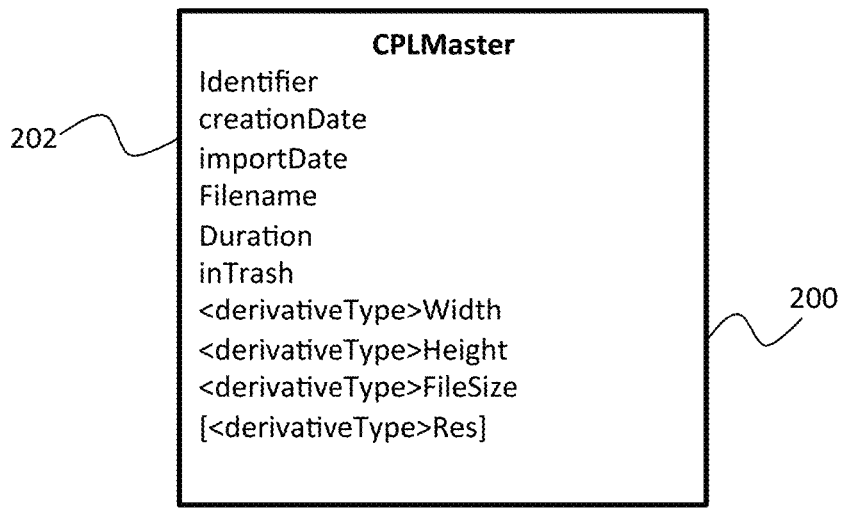
FIG. 2A illustrates a master cloud data object describing a master media file. A master media file is an unedited original media item.
Figure 2B:
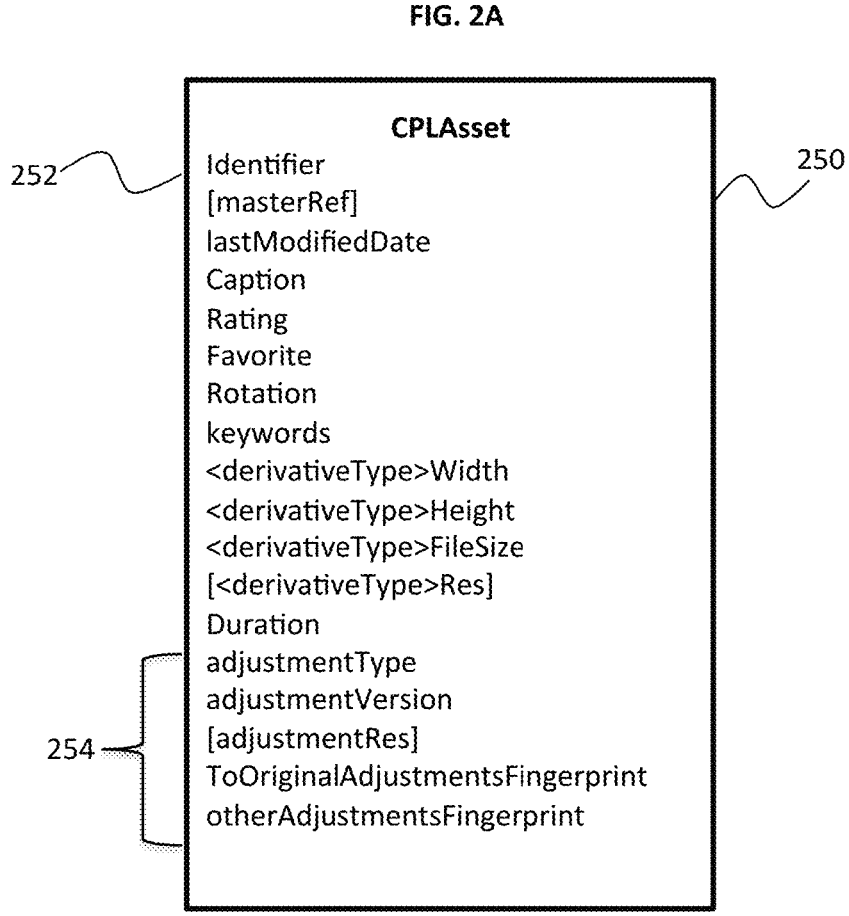
FIG. 2B illustrates an asset cloud data object describing a media asset.

Media items uploaded to the cloud storage and cloud computing service platform 110 can be stored in media repositories 115, 116, 117 and the cloud storage and cloud computing service platform 110 and the CPL engine 120 can describe and refer to the stored media items using data objects including identifiers, fingerprints, etc. For example, in some embodiments, the de-duplication module 124 examines cloud data objects describing media files or derivative assets of media file to determine whether or not to enforce a de-duplication policy. FIGS. 2A-2B illustrate exemplary cloud data objects used in a Cloud Photo Library system according to some embodiments of the present technology.

FIG. 2A illustrates a master cloud data object 200 describing a master media file. A master media file is an unedited original media item. The master cloud data object 200 describing the master file includes information describing the file including an identifier (aka "fingerprint") 202 that uniquely identifies the master file.

When a master media file is edited, copied, enhanced, etc., an asset is created that references the master. FIG. 2B illustrates an asset cloud data object 250 describing a media asset. The asset cloud data object 250 includes information about the asset, including a reference 252 to the master fingerprint and adjustment fingerprints 254 that identify one or more adjustments to the master that have been made in an asset and that are used to compare assets.

Figure 2C:
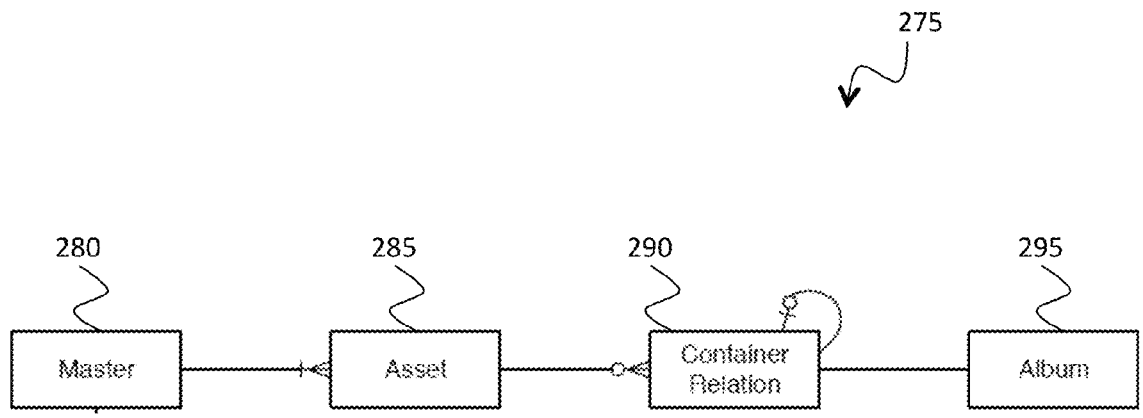
FIG. 2C illustrates an example entity relationship diagram for cloud data objects according to some embodiments of the present technology.

FIG. 2C illustrates an example entity relationship diagram 275 for cloud data objects according to some embodiments of the present technology. A master object 280 can reference one or more asset 285. For example, a raw image captured by an electronic device can comprise a master and down-sized version(s) of the raw image can be assets. The container relation object 290 can reference a hierarchical relationship (folder/sub-folder) for album objects 295. A container object can reference zero or more sub-containers and any of those can reference zero or more sub-containers or assets.

Figure 3A:
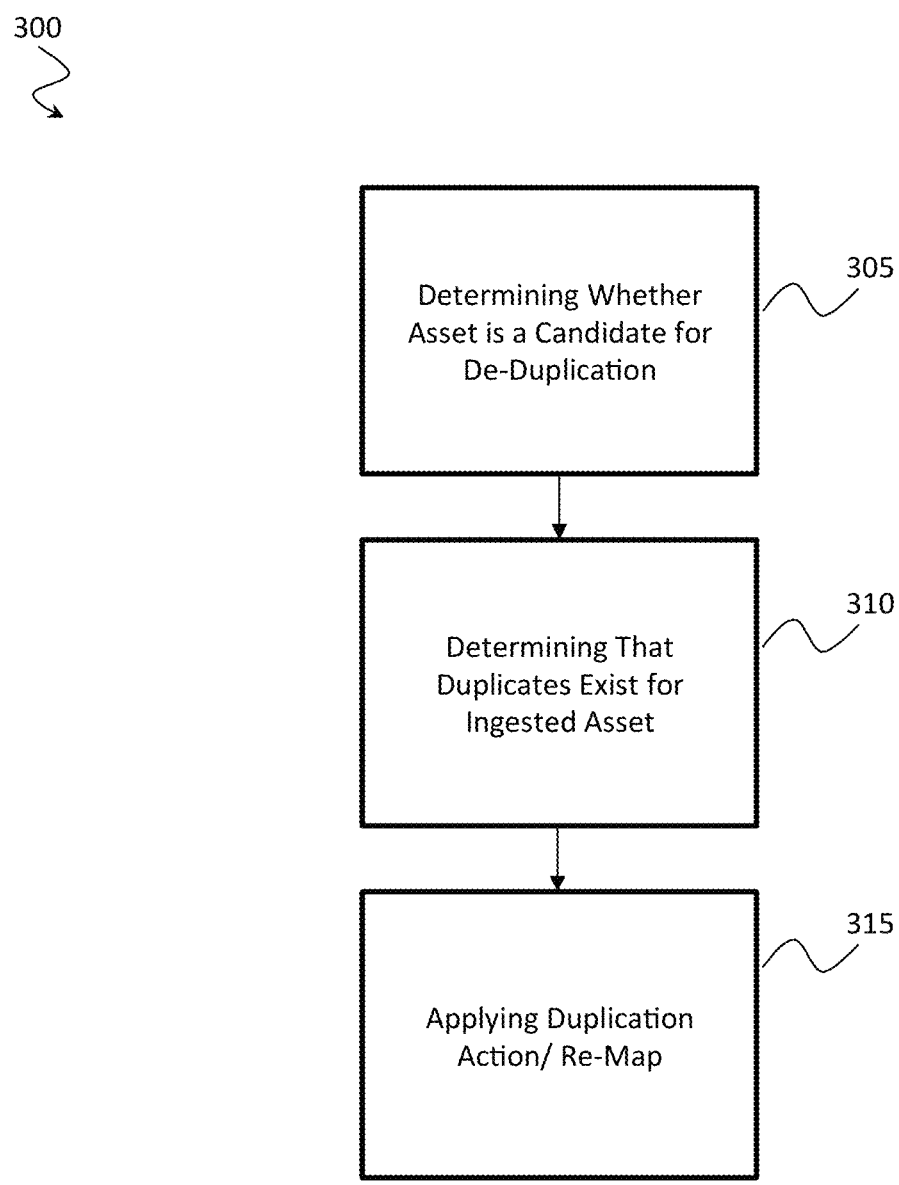
FIG. 3A illustrates a method of determining when duplications are present in the cloud storage and cloud computing service platform according to some embodiments of the present technology.

As explained above with reference to FIG. 1, a de-duplication module 124 of a CPL engine 120 can determine, during ingestion, when duplications are present in the cloud storage and cloud computing service platform 110. FIG. 3A illustrates a method 300 of determining when duplications are present in the cloud storage and cloud computing service platform according to some embodiments of the present technology.

The method 300 illustrated in FIG. 3A involves determining whether an asset is a candidate for de-duplication 305, determining that duplicates exist for an ingested asset 310, and applying a remedial action and/or remapping the data object(s) for the ingested asset 315.

In some embodiments of the present technology, duplicate assets are checked within the batch of uploads and objects in the cloud storage and cloud computing service platform 110. In some cases, cloud data objects within the same ingestion batch are never considered to be duplicates of one another.

In some embodiments, assets in an ingestion batch which do not include a reference to a master fingerprint will not be checked for duplicates. In other words, all assets in such a batch will be persisted on the cloud storage and cloud computing service platform 110 as distinct records. For example, if an ingestion batch contains Asset1, Asset2 but no master, Asset1 and Asset2 will be persisted as distinct records regardless of whether there are assets with the same fingerprints that exist on the cloud storage and cloud computing service platform 110.

Also, assets in an ingestion batch which contain a referencing master fingerprint, but also contain an asset that already exists on the cloud storage and cloud computing service platform 110 with the same referencing master fingerprint will not be checked for duplicates. Such assets can be chosen to persist as distinct records. For example, if a batch contains Master1, Asset1, Asset2, with all assets referencing Master1, and Asset1 already exist on the cloud storage and cloud computing service platform 110, then Asset2 will be persisted as a distinct record. Note that this is the case even if Asset1 is remapped (see below for discussion on re-mapping.)

Also, assets in an ingestion batch which contain the referencing master fingerprint, but which do not contain additional fingerprints referencing the same master will be checked for dupes according to a de-duplication workflow, as explained in greater detail below.

Figure 3B:
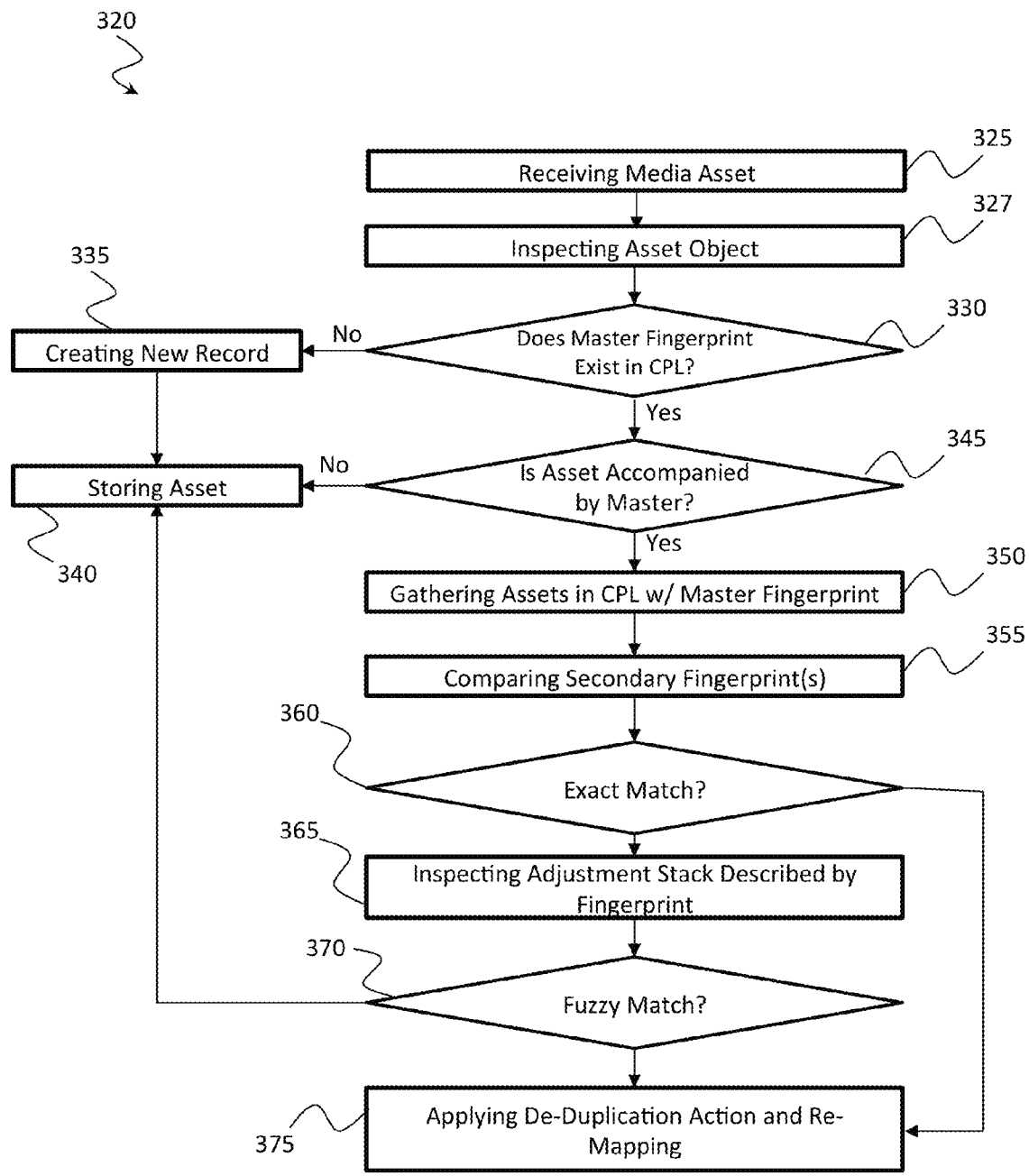
FIG. 3B illustrates a method of analyzing ingested media items and determining to apply de-duplication action(s) according to some embodiments of the present technology.

FIG. 3B illustrates a method 320 of analyzing ingested media items and determining to apply de-duplication action(s) according to some embodiments of the present technology.

First, the method 320 involves receiving a media asset 325 in a batch of media uploads and inspecting the asset object 327. For example, the asset object can include a reference to a master object fingerprint.

Next, the method 320 involves determining whether a master object exists in the CPL by determining if the master fingerprint is present in any objects in the CPL 345. If not, the method 320 involves creating a new record (e.g. master object with master fingerprint) for the ingested asset 335 and storing the asset 340.

If the asset object includes reference to a master fingerprint already present in the CPL, the method 320 involves determining whether the asset is accompanied by a master asset 345. If not, the method 320 does not subject the asset to a de-duplication process and stores the asset 340 (i.e. interpreting the absence of the master asset along with the ingested asset as implying a user explicitly wants to duplicate the asset.

If the asset object includes reference to a master fingerprint already present in the CPL and if asset is not accompanied by a master asset, the method 320 involves gathering all assets in the CPL with the same master fingerprint 350 and then comparing secondary fingerprint(s) 355 that may be a match between the ingested asset and the assets already stored in the CPL.

The method 320 involves determining whether the ingested asset matches an existing asset exactly 360. If so, a de-duplication action is applied 375. If not, an adjustment stack described by a fingerprint in the asset (e.g. ToOriginalAdjustmentsFingerprint from FIG. 2B) is inspected 365.

The fingerprint can describe adjustments made to the media item, e.g. cropping, rotating, stretching, re-sizing, sharpening, color adjustments, red-eye adjustment, auto-enhance, lighten, darken, painting, etc. In some embodiments, the fingerprint is inspected instead of the actual adjustment to avoid the server from knowing sensitive user information.

Next, the method 320 involves determining if a fuzzy match exists in the CPL 370, e.g. according to the de-duplication logic described in more detail below. If a fuzzy match does not exist, the ingested asset is stored in the CPL. Conversely, if a match does exist then the method 320 involves applying a de-duplication action and re-mapping the ingested asset 375.

In some embodiments, additional fingerprints (e.g. secondary, tertiary, etc.) can be inspected in a cloud storage ingestion process. For example, a secondary fingerprint can be used for the fuzzy match, a tertiary fingerprint can be used to describe the exact adjustment, etc.

In some embodiments of the present technology, a fuzzy match is found when the adjustments described in the secondary fingerprints fall within a predefined group of adjustment considered acceptably different for the purpose of de-duplication. In some cases, these adjustments include red-eye adjustment, auto-enhance, lighten, and darken.

In some embodiments of the present technology, a de-duplication action can involve modifying one or more fields in the asset object, thereby re-mapping the object such that container object referenced by the asset object references the updated field.

For example, an asset object specifies the photo/video metadata and has an itemId field which references the id of the CPLAs set and a containerId field which references the id of the container (which can be an album for example) which contains the CPLAs set. If the asset being referenced is a found to be a duplication, the content of the itemId field may need to be modified to reflect the change.

Figure 2D:
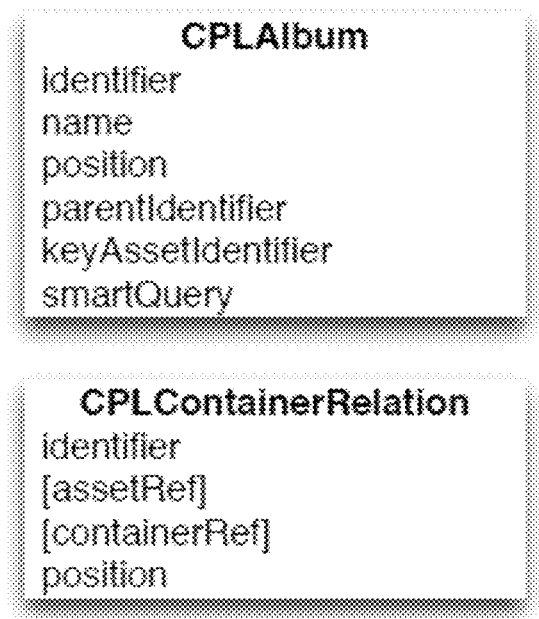
FIG. 2D illustrates example ContainerRelation objects.

Using this example, the following workflow describes an example de-duplication process according to some embodiments of the present technology. First, the client must upload the CPLAsset first before it uploads the ContainerRelation objects that reference the CPLAsset in a batch. FIG. 2D illustrates exemplary ContainerRelation objects.

If the batch becomes too large because there are many ContainerRelation objects referencing a given Asset, the client can send in the request in separate batches, with the Asset being sent first before other ContainerRelation objects in the first batch, and the remaining ContainerRelation objects in subsequent batches without having to include the Asset again.

Also, the client avoids sending the same object (Assets or ContainerRelation objects) twice in a given batch. Otherwise, the server will detect the same record Id in the same batch and will issue an error response (Bad Request) message, failing the entire batch.

For every object to be updated in the batch request, the CPL determines if the object is an asset, a ContainerRelation object, or some other object type.

If the object (e.g. A1) is an Asset, the CPL determines if A1 is a duplicate of another asset (e.g. A2) on the server (De-duplication logic explained below). If not, this is just the normal upload flow, and the request objects will be updated accordingly. Note that any asset on the server (A2 in this case) can only be found to be a duplicate of at most one record in the batch. In the above example, any subsequent Assets after A1 in the batch will not be checked for duplicates against A2 (because once defined as a duplicate of A1, A2 is no longer available).

If A1 is a duplicate, then the CPL applies the de-duplication logic on A1. For example, the CPL can inject in A1 a field named remappedRef which is a reference to the Id of A2. The server may also modify the content of A2 during the process and A1 and A2 are persisted after this batch request is processed.

If the object is a ContainerRelation object, the CPL looks up its itemId field to determine if the asset Id it references to is already remapped, and applies the de-duplication logic on this object to fix up the itemId reference if so. The ContainerRelation object may also be remapped to another ContainerRelation object. That is, the CPL may also inject the remappedRef field to a ContainerRelation object, if the ContainerRelation object also needs to be remapped.

When the asset referenced by a given ContainerRelation object in the request batch is determined to be a duplicate and remapped, the ContainerRelation object is modified to have its itemId point to the asset that is being mapped to. In this case, a ContainerRelation object is updated, and no de-duplication of ContainerRelation objects is involved. For example, suppose the request consists of A1 and a ContainerRelation which references A1 and Album2 (e.g. "CRasset1album2" or "CR12") and A1 is remapped to A2. Then we just modify CR12 to reference A2 and Album2 or CR22.

However, say if there exists a CR22' in the server (which references A2 and Album2), then the modified CR12 is essentially referencing the same (itemId, ContainerId) as CR22'. In this case, the server remaps CR12 to CR22'. Since CR12 is now remapped, and the client no longer refers to the values of other fields in remapped objects, the CPL does not need to update the itemId of CR12. Instead, the CPL will copy the contents of CR12 to CR22* if CR12 is deemed more recent than CR22*.

Finally, if the object in the batch upload is any other type of object, the server does not de-duplicate.

Next, upon syncing with the CPL (e.g. via a getchanges call), the client will discover that some objects returned from the server contain the field remappedRef. In response, the client uses the remappedRef to fix up its own object graph. Also, when done with uploading the Assets (or ContainerRelations) that have been remapped, the client issues a delete request to the server to delete the remapped objects. In other words, the client manages the lifetime of the remapped objects because the client knows when it is done with the remapped objects.

The client can also treat the remappedRef field as 'read only' and not update this field. Also, any object that is remapped (i.e. contains a remappedRef field) may contain stale information in its other fields, so in some cases, the client does not rely on the fields in remapped objects. Instead, the client can consult the corresponding fields of the objects that the object is remapped to.

In some cases, the following exemplary de-duplication logic is implemented on the CPL. The de-deuplication logic involves the CPL using the following fields in the Asset: similarToOriginalAdjustmentsFingerprint ("SFP") and otherAdjustmentsFingerprint ("OFP"). The value of these fields are strings which are hashes provided by the client. The CPL can use these fields and the lastModfiedDate field to de-duplicate. FIGS. 5A and 5B illustrate tables showing example de-duplication strategies. The tables rely on the following terminology: an Asset "has adjustment" if its metadata contains either the SFP or OFP or both fields. It has no adjustment if it does not contain either field. An asset A1 is "more recent" than another asset A2 if the value of the recordModificationDate field of A1 is more recent than that of A2 (that is, the epoch time of A1 is strictly greater than that of A2). A phrase "A1 remapped to A2" means a field named 'remappedRef' which is a reference type being added to the metadata of A1. The value of the reference is the id of A2.

FIG. 4A illustrates de-duplication logic when at most one of the two assets considered for de-duplication has adjustments. FIG. 4B illustrates de-duplication logic when both assets have adjustments.

As explained above, cloud computing is a type of Internet-based computing in which a variety of resources are hosted and/or controlled by an entity and made available by the entity to authorized users via the Internet. An exemplary cloud computing system configuration 500 is illustrated in FIG. 5 wherein a variety of electronic devices can communicate via a network for purposes of exchanging content and other data. The system can be configured for use on a wide variety of network configurations that facilitate the intercommunication of electronic devices. For example, each of the components of system 500 in FIG. 5 can be implemented in a localized or distributed fashion in a network.

System 500 can be configured to include cloud computing resources 520. The cloud resources can include a variety hardware and/or software resources, such as cloud servers 522, cloud databases 524, cloud storage 526, cloud networks 528, cloud applications, cloud platforms, and/or any other cloud-based resources. In some cases, the cloud resources are distributed. For example, cloud storage 526 can include multiple storage devices. In some cases, cloud resources can be distributed across multiple cloud computing systems and/or individual network enabled computing devices. For example, cloud computing resources 520 can communicate with servers $504_1, 504_2, \ldots, 504_n$ (collectively "504"), database 506, and/or any other network enabled computing device to provide the cloud resources.

Furthermore, in some cases, the cloud resources can be redundant. For example, if cloud computing resources 520 is configured to provide data backup services, multiple copies of the data can be stored such that if one storage resource is unavailable the data will still be available to the user. In another example, if cloud computing resources 520 are configured to provide software, the software can be available from different cloud servers so that the software can be served from the closest server.

In system 500, a user interacts with the cloud computing resources 520 through user terminals $502_1, 502_2, \ldots 502_n$ (collectively "502") connected to a network by direct and/or indirect communication. Cloud computing resources 520 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud computing resources 520 can concurrently accept connections from and interact with multiple electronic devices.

Cloud computing resources 520 can provide cloud resources through a variety of deployment models, such as public, private, community, hybrid, and/or any other cloud deployment model. In some cases, cloud computing resources 520 can support multiple deployment models. For example, cloud computing resources 520 can provide one set of resources through a public deployment model and another set of resources through a private deployment model.

In some configurations, a user terminal $502_i$ can access cloud computing resources 520 from any location where an Internet location is available. However, in other cases, cloud computing resources 520 can be configured to restrict access to certain resources such that a resource can only be accessed from certain locations. For example, if cloud computing resources 520 is configured to provide a resource using a private deployment model, then cloud computing resources 520 can restrict access to the resource, such as by requiring that a user terminal $502_i$ access the resource from behind a firewall.

Cloud computing resources 520 can provide cloud resources to user terminals 502 through a variety of service models, such as Software as a Service (SaaS), Platforms as a service (PaaS), Infrastructure as a Service (IaaS), and/or any other cloud service models. In some cases, cloud computing resources 520 can provide multiple service models to a user terminal $502_i$. For example, cloud computing resources 520 can provide both SaaS and IaaS to a user terminal $502_i$. In some cases, cloud computing resources 520 can provide different service models to different user terminals 502. For example, cloud computing resources 520 can provide SaaS to user terminal $502_1$ and PaaS to user terminal $502_2$.

In some cases, cloud computing resources 520 can maintain an account database. The account database can store profile information for registered users. The profile information can include resource access rights, such as software the user is permitted to user, maximum storage space, etc. The profile information can also include usage information, such as computing resources consumed, data storage location, security settings, personal configuration settings, etc.

Cloud computing resources 520 can provide a variety of functionality that requires user interaction. Accordingly, a user interface (UI) can be provided for communicating with cloud computing resources 520 and/or performing tasks associated with the cloud resources. The UI can be accessed via an end user terminal $502_i$ in communication with cloud computing resources 520. The UI can be configured to operate in a variety of client modes, including a fat client mode, a thin client mode, or a hybrid client mode, depending on the storage and processing capabilities of cloud computing resources 520 and/or the user terminal $502_i$. Therefore, a UI can be implemented as a standalone application operating at the user terminal in some embodiments. In other embodiments, a web browser-based portal can be used to provide the UI. Any other configuration to access cloud computing resources 520 can also be used in the various embodiments.

As described above, in some configurations, the cloud computing resources can be used to store user data. The present disclosure contemplates that, in some instances, this gathered data might include personal and/or sensitive data. The present disclosure further contemplates that the entities responsible for the collection, analysis, disclosure, transfer, storage, or other use of such data should implement and consistently use privacy policies and practices that are generally recognized meeting or exceeding industry or governmental requirements for maintaining personal information data private and secure. For example, personal data from users should be collected for legitimate and reasonable uses of the entity and not shared or sold outside of those legitimate uses. Further, such collection should occur only after the informed consent of the users. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal data. That is, the present disclosure contemplates that hardware and/or software elements can be provided to prevent or block access to such personal data. For example, the present technology can be configured to allow users to select the data that is stored in cloud storage.

Therefore, although the present disclosure broadly covers use of personal data to implement one or more various disclosed embodiments, the present disclosure also contemplates that the various embodiments can also be implemented without the need for accessing such personal data. That is, the various embodiments of the present technology are not rendered inoperable due to the lack of all or a portion of such personal data. For example, non-personal data can be stored in cloud storage.

Figure 6A:
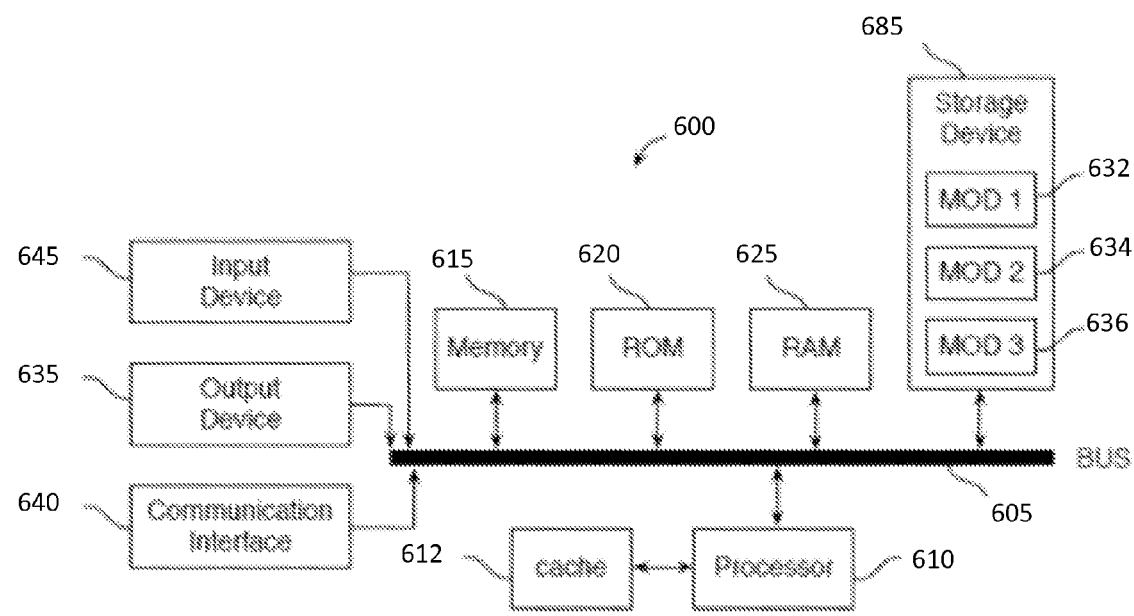
FIG. 6A and FIG. 6B illustrate exemplary possible system embodiments.
Figure 6B:
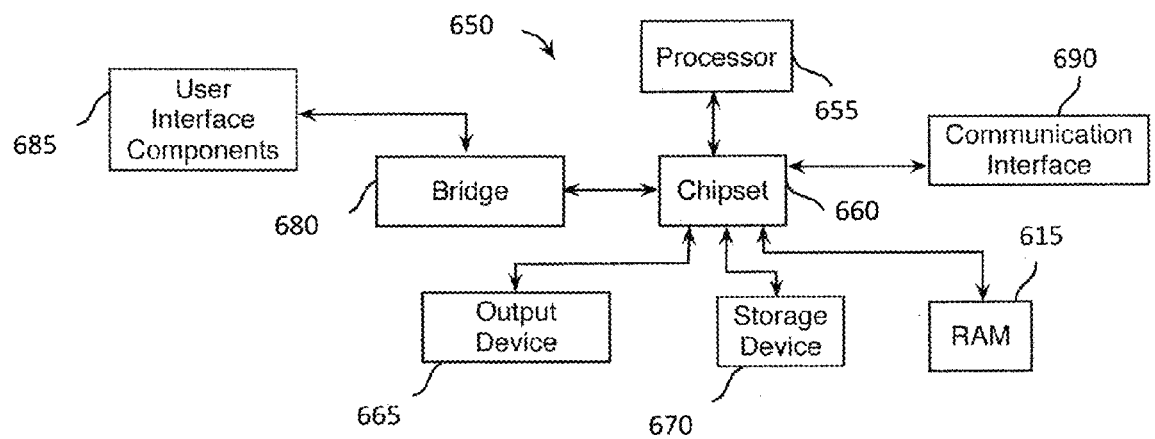

FIG. 6A and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method of identifying duplicate media items in a cloud media library comprising:
   receiving a media file from a client device;
   inspecting one or more data objects in the media file;
   identifying, in a data object, a reference to a master asset fingerprint and a secondary fingerprint;
   determining that a master asset described by the master asset fingerprint is stored by the cloud media library;
   gathering one or more additional data objects in the cloud media library describing other media files stored by the cloud media library and including a reference to the master asset fingerprint of the received media file;
   determining that the secondary fingerprint in the data object associated with the media file matches a secondary fingerprint of an additional data object for an additional media file stored by the cloud media library;
   selecting the media file received from the client device or the additional media file based on the secondary fingerprint of the media file received and the secondary fingerprint of the additional media file; and
   performing a de-duplication action.

2. The computer-implemented method of claim 1, wherein each secondary fingerprint describes one or more adjustments that have been made to the master asset.

3. The computer-implemented method of claim 2, wherein determining that the secondary fingerprint in the data object associated with the media file matches the secondary fingerprint of the additional data object for the other media file stored by the cloud media library, further comprises:
   inspecting the one or more adjustments described in the secondary fingerprints; and
   determining that the adjustments described in the secondary fingerprints fall within a predefined group of adjustments considered acceptably different for a purpose of de-duplication.

4. The computer-implemented method of claim 2, wherein selecting the media file received from the client device or the additional media file further comprises:
   examining the secondary fingerprint of the received media file for a presence of adjustments made to the received media file;
   examining a time stamp described in a data object of the received media file to determine when the received media file was last modified;
   examining the secondary fingerprint of the additional media file for a presence of adjustments made to the additional media file;
   examining a time stamp described in a data object of the additional media file to determine when the additional media file was last modified; and
   selecting the media file received from the client device or the additional media file based on a de-duplication policy that factors the presence and time stamps of adjustments made to the media file received from the client device and the additional media file.

5. The computer-implemented method of claim 1, wherein each of the media file received from the client device and the additional media file is associated with a container data object describing a relationship with another media file in the cloud media library.

6. The computer-implemented method of claim 5, wherein performing a de-duplication action further comprises:
   re-mapping the container data object of the non-selected media file to describe a relationship with the selected media file.

7. The computer-implemented method of claim 1, wherein the cloud media library stores media files in an external content repository.

8. A system for identifying duplicate media items in a cloud media library comprising:
   a content ingestion module configured to receive a media file from a client device, inspect one or more data objects in the media file, and identify, in a data object, a reference to a master asset fingerprint and a secondary fingerprint;
   a de-duplication module configured to determine that a master asset described by the master asset fingerprint is stored by the cloud media library, gather one or more additional data objects in the cloud media library describing other media files stored by the cloud media library and including a reference to the master asset fingerprint of the received media file, determine that the secondary fingerprint in the data object associated with the media file matches a secondary fingerprint of an additional data object for an additional media file stored by the cloud media library, and select the media file received from the client device or the additional media file based on the secondary fingerprint of the media file received and the secondary fingerprint of the additional media file; and
   a re-mapping module configured to perform a de-duplication action.

9. The system of claim 8, wherein each secondary fingerprint describes one or more adjustments that have been made to the master asset.

10. The system of claim 9, wherein the de-duplication module is configured to inspect the one or more adjustments described in the secondary fingerprints and determine that the adjustments described in the secondary fingerprints fall within a predefined group of adjustments considered acceptably different for a purpose of de-duplication.

11. The system of claim 9, the de-duplication module is further configured to examine the secondary fingerprint of the received media file for a presence of adjustments made to the received media file, examine a time stamp described in a data object of the received media file to determine when the received media file was last modified, examine the secondary fingerprint of the additional media file for a presence of adjustments made to the additional media file, examine a time stamp described in a data object of the additional media file to determine when the additional media file was last modified, and select the media file received from the client device or the additional media file based on a de-duplication policy that factors the presence and time stamps of adjustments made to the media file received from the client device and the additional media file.

12. The system of claim 8, wherein each of the media file received from the client device and the additional media file is associated with a container data object describing a relationship with another media file in the cloud media library.

13. The system of claim 12, wherein the re-mapping module performs a de-duplication action that involves re-mapping the container data object of the non-selected media file to describe a relationship with the selected media file.

14. The system of claim 8, wherein the cloud media library stores media files in an external content repository.

15. A non-transitory computer-readable storage medium comprising:

a medium configured to store computer-readable instructions thereon; and the computer-readable instructions that, when executed by a processing device cause the processing device to perform a method of identifying duplicate media items in a cloud media library comprising:

receiving a media file from a client device;

inspecting one or more data objects in the media file;

identifying, in a data object, a reference to a master asset fingerprint and a secondary fingerprint;

determining that a master asset described by the master asset fingerprint is stored by the cloud media library;

gathering one or more additional data objects in the cloud media library describing other media files stored by the cloud media library and including a reference to the master asset fingerprint of the received media file;

determining that the secondary fingerprint in the data object associated with the media file matches a secondary fingerprint of an additional data object for an additional media file stored by the cloud media library;

selecting the media file received from the client device or the additional media file based on the secondary fingerprint of the media file received and the secondary fingerprint of the additional media file; and performing a de-duplication action.

16. The non-transitory computer-readable storage medium of claim 15, wherein each secondary fingerprint describes one or more adjustments that have been made to the master asset.

17. The non-transitory computer-readable storage medium of claim 16, wherein determining that the secondary fingerprint in the data object associated with the media file matches the secondary fingerprint of the additional data object for the other media file stored by the cloud media library, further comprises:

inspecting the one or more adjustments described in the secondary fingerprints; and determining that the adjustments described in the secondary fingerprints fall within a predefined group of adjustments considered acceptably different for a purpose of de-duplication.

18. The non-transitory computer-readable storage medium of claim 16, wherein selecting the media file received from the client device or the additional media file further comprises:

examining the secondary fingerprint of the received media file for a presence of adjustments made to the received media file;

examining a time stamp described in a data object of the received media file to determine when the received media file was last modified;

examining the secondary fingerprint of the additional media file for a presence of adjustments made to the additional media file;

examining a time stamp described in a data object of the additional media file to determine when the additional media file was last modified; and selecting the media file received from the client device or the additional media file based on a de-duplication policy that factors the presence and time stamps of adjustments made to the media file received from the client device and the additional media file.

19. The non-transitory computer-readable storage medium of claim 15, wherein each of the media file received from the client device and the additional media file is associated with a container data object describing a relationship with another media file in the cloud media library.

20. The non-transitory computer-readable storage medium of claim 19, wherein performing a de-duplication action further comprises:

re-mapping the container data object of the non-selected media file to describe a relationship with the selected media file.

* * * * *